United States Patent [19]

Takayanagi et al.

[11] 4,168,187
[45] Sep. 18, 1979

[54] WEAR RESISTING HIGH PERMEABILITY ALLOY

[75] Inventors: Kiyoshi Takayanagi, Tokyo; Akira Negishi, Kawasaki; Shinye Kauosha, Yokohama, all of Japan

[73] Assignee: The Furukawa Electric Co., Ltd., Tokyo, Japan

[21] Appl. No.: 896,612

[22] Filed: Apr. 14, 1978

Related U.S. Application Data

[63] Continuation of Ser. No. 809,468, Jun. 23, 1977, abandoned, which is a continuation of Ser. No. 646,753, Jan. 6, 1976, abandoned.

[30] Foreign Application Priority Data

Jul. 26, 1975 [JP] Japan .................................. 50/90720

[51] Int. Cl.$^2$ ....................... C22C 38/02; C22C 38/06
[52] U.S. Cl. ............................... 148/31.55; 75/123 B; 75/123 L; 75/124; 148/101
[58] Field of Search ................. 75/124, 123 L, 123 B; 148/100, 101, 111, 31.57, 31.55

[56] References Cited

U.S. PATENT DOCUMENTS

| | | | |
|---|---|---|---|
| 2,193,768 | 3/1940 | Masumoto et al. | 75/124 |
| 2,861,908 | 11/1958 | Mickelson et al. | 75/128 E |
| 3,216,823 | 11/1965 | Gulya et al. | 75/124 |
| 3,632,456 | 1/1972 | Sakakura et al. | 148/111 |

FOREIGN PATENT DOCUMENTS 648140 9/1962 Canada .................................... 75/124

*Primary Examiner*—Arthur J. Steiner
*Attorney, Agent, or Firm*—Armstrong, Nikaido, Marmelstein & Kubovcik

[57] ABSTRACT

A novel high permeability alloy which excels in wear resistance, yet possesses a high permeability, and is particularly suitable for use in magnetic recording heads. The composition of the wear resistant, high permeability alloy of this invention includes a small amount (0.001–1 wt %) of boron added to an alloy known by the name of "sendust" or a sendust-based alloy. The wear resistance of sendust or sendust-based alloys is greatly improved by the addition of boron.

6 Claims, No Drawings

WEAR RESISTING HIGH PERMEABILITY ALLOY

This is a continuation of application Ser. No. 809,468, filed June 23, 1977, now abandoned, which is a continuation of Ser. No. 646,753, filed June 6, 1976 and now abandoned.

DETAILED DESCRIPTION OF THE INVENTION

This invention relates to a high permeability alloy of improved wear resistance.

Magnetic recording has rapidly advanced and become popular in recent years. As a result, there is a strong demand for a magnetic material which excels not only in magnetic properties but also in wear and chipping resistance for use in magnetic recording heads.

Permalloy and ferrite have hitherto been employed as magnetic materials for the cores of magnetic recording heads. However, because of the emergence of magnetic recording tapes made of chromic oxide ($CrO_2$) which tends to cause rapid wear of other materials contacting therewith and also because of the popularization of magnetic cards, permalloy has been found disadvantageous in terms of wear while ferrite has been found deplorably inferior in chipping resistance when used for magnetic cards. In view of such shortcomings of the conventional magnetic materials, there has arisen a strong need for a new magnetic material that is free from such shortcomings.

An alloy of Al-Si-Fe composition made its debut to meet such a need. This iron-silicon-aluminum alloy has long been known since 1933 (Japanese Patent Publication 2409) as a high permeability magnetic material. Following the Japanese patent publication, the material has become widely known under the name of "sendust" through "Ferromagnetism Bozorth, R. M. 1951" Van. Nostland Reinhold, etc. After its debut, some attempts were made to improve the sendust alloy by adding some additives such as Ti, Zr, Mn, Ge, Mo, Nb, Cu, Ta, W, Hf, Pt metals, Cr, V, Sb and Be to the basic composition of sendust alloy comprising 4.0–8.0 wt % of Al, 8.0–11.0 wt % if Si and the balance Fe. Through such attempts, there have been introduced some sendust-bases alloys.

The sendust alloy and these sendust-based alloys are principally composed of Fe, Al and Si and have a Vickers hardness of about 500. They not only excel permalloy in magnetic properties but also are much superior to permalloy in wear resistance. They also greatly excell ferrite in chipping resistance. Therefore, they are expected to find a wide range of applications in the future as magnetic materials.

Recently, however, requirement for magnetic cards has rapidly increased and magnetic recording materials have come to be applied to very severe operating conditions such as at an unattended wicket, etc. Such severe conditions now have come to call for yet another magnetic material that still excels such sendust-based alloys in wear resistance.

Therefore, in an attempt to further improve the wear resistance of the sendust alloy and the sendust-based alloys and also to improve their machinability and resistance to chipping, peeling and cracking, the present inventors have previously developed an improved sendust alloy which is obtained by addition of 0.01–1.0 wt % of either rare earth metals or phosphor or both as disclosed in U.S. Ser. No. 610,828.

The present invention is directed to a still further improvement in the wear resistance of the sendust alloy, the sendust-based alloy and the above stated improved sendust alloy. This invention is based on the finding which has been made through comprehensive researches and experiments conducted by adding various elements to these alloys to see the effects of such addition upon their wear resistance and magnetic properties. According to the finding, addition of a small amount of boron very effectively contributes to the improvement in the wear resistance of these alloys whose basic composition is Fe-Al-Si.

The terms "sendust alloy" and "sendust-based alloys" as used in the present specification comprehensively denote all of the high permeability alloys having a basic composition of Fe-Al-Se. However, to be more specific, these alloy can be grouped as shown below:

(1) Sendust Alloy (hereinafter called "S alloy" for short)
   S=4.0 to 8.0 wt % Al—8.0 to 11.0 wt % Si—balance Fe (2) Sendust-Based Alloy (hereinafter called "S'alloy")
   (a) S'=S+0.01 to 3.5 wt % of Ti, Zr, Mn, Ge, Mo, Nb, Cu, Be, W, Ta, Hf, Pt metals, Cr, V, Sb singly or in combination
   (b) S'=S+0.01 to 1.0 wt % of Re and/or P NOTE Re: Rare earth metal
   (c) S'=S+0.01 to 3.5 wt % of Ti, Zr, Mn, Ge, Mo, Nb, Cu, Be, W, Ta, Hf, Pt metals, Cr, V, Sb singly or in combination +0.01 to 1.0 wt % of Re and/or P The present inventors further conducted researches by adding two or more elements in varied combinations to alloys with a basic composition of Fe-Al-Si to find the effects of such addition. Through these researches, they have found that addition of B in combination with one or more elements selected from the group consisting of Ti, Zr, Nb, Ta, W, P or rare earth elements results in a further salient improvement in the wear resistance and that the best results can be obtained from addition of B in combination with Ti. And they have found that addition of boron in combination with one or more elements selected from the group consisting of Hf, Pt metals, Cr, V, Mn, Ge, Mo, Sb, Cu, Be is also effective in the improvement of the wear resistance.

Addition of one or more elements selected from the group consisting of Ti, Zr, Nb, Ta, W, P and rare earth elements improves not only the wear resistance but also in machinability of the alloy as a result of reduction in grain size effected by such addition. With B added in combination, however, the wear resistance is multiplicatively improved. Such multiplicative improving effect also appears in addition of one or more elements selected from the group consisting of Hf, Pt metals, Cr, V, Mn, Ge, Mo, Sb, Cu, Be in combination with B.

In accordance with this invention, the basic composition of the sendust alloy or sendust-based alloys to which B is to be added is restricted to 4–8 wt % of Al, 8–11 wt % of Si and balance Fe. This is because Al and Si are principal components and their permeability would be lowered and the magnetic properties that characterize S and S' alloys would be lost if the Al content is less than 4 wt % or more than 8 wt % and Si content less than 8 wt % or more than 11 wt %.

The content of B is set within the range of 0.001–1 wt %, because the wear resistance cannot be improved with the content of B set below 0.001 wt % while, with the content set above 1 wt %, the permeability of the alloy will be lowered too much for use as material for magnetic recording heads.

The total content of the elements such as Ti, Zr, Nb, Ta, Hf, Pt metals, Cr, V, Mn, Ge, Mo, Sb, Cu, Be, W, P and rare earth elements is limited to the range of 0.01–3.5 wt %, because the addition of less than 0.01 wt % of these elements will not sufficiently improve wear resistance and in machinability of the alloy while the addition of more than 3.5 wt % thereof will greatly decrease the permeability and make the alloy too brittle for machining. The further details and advantages of this invention will become apparent from the following description of embodiments, wherein Misch metal (hereinafter called MM for short), La, Ce, Sm, Y, etc. are added as rare earth elements.

EXAMPLES 1–65 AND COMPARATIVE EXAMPLES 1–9

Table 1 shows the examples of alloys prepared in accordance with this invention (Examples 1–65) in comparison with the examples of the conventional alloys (Comparative Examples 1–9). In each example, 1 kg of the alloy was prepared by melting through high frequency heating under a vacuum of $10^{-3}$–$10^{-4}$ mmHg. The alloy was then deoxidized with Mn and degasified. Following this, the alloy was made into a plate shaped ingot measuring 20×60×100 mm.

The micro-Vickers hardness of each ingot sample thus prepared was measured in a state of having been annealed at a temperature of 1000° C. for 12 hours under atmospheric pressure. Then, the ingot was cut and ground by a grinder into a thin plate measuring 0.33×20×60 mm. The thin plate was subjected to an electro-spark perforation process and grinding and thus made into an annular shaped test piece for measuring effective permeability. Each test piece thus prepared measuring 8 mm in outer diameter and 4 mm in inner diameter was subjected to test to find the effective permeability thereof.

The above stated annular test piece was heat-treated. After the heat treatment, an enameled wire of 0.1 mm diameter was wound on each test piece in 50 equally spaced turns. Then, using a Maxwell bridge, impedance at 1 kc is first measured. Following this, the effective permeability ($\mu e$) was obtained from the following formula:

$$\mu e = \frac{L}{W} \cdot \frac{D \cdot \ln^2}{N^2} \cdot 10^{-1}/\mu o$$

where
L: Inductance (mH)
D: Density (gr/cc)
W: Weight of test piece (gr)
ln: Mean length of magnetic path
$\mu o$: Vacuum permeability ($=4\pi \cdot 10^{-7}$ H/m)
N: Number of turns

NOTE

Conditions of heat treatment: 1000° C.×3 hours; temperature lowered at a rate of 200° C./hr; and 700° C.×1 hour, furnace cooling to room temperature Atmosphere of heat treatment: Vacuum of $3\times10^{-4}$ mmHg To determine the wear resistance, each ingot was cut in the direction parallel to the 60 mm-long side thereof with a resinoid cutter measuring 150 mm in diameter and 0.7 mm in thickness. The length of time required for cutting each ingot sample was measured for comparison. The cutter was pressed against the ingot with a force of 2 kg and rotated at a speed of 1200 r.p.m.

The results of test listed in Table 1 clearly indicate that the alloys prepared in accordance with the present invention greatly excel the conventional alloys in wear resistance though nearly equal in hardness.

TABLE 1

| Examples | Example No. | Compositions | Time req'd for cutting (min.) | Micro-Vickers hardness | $\mu e$ |
|---|---|---|---|---|---|
| CONVENTIONAL ALLOYS | Comparative Example 1 | Fe-9.1Si-6.4Al | 17.7 | 459 | 6,850 |
| | 2 | Fe-9.6Si-5.4Al-3.5Ti | 25.6 | 521 | 7,600 |
| | 3 | Fe-9.6Si-6.4Al-0.1Zr | 17.2 | 474 | 9,410 |
| | 4 | Fe-9.6Si-5.4Al-0.5Nb | 18.4 | 483 | 9,390 |
| | 5 | Fe-9.6Si-5.4Al-0.5MM | 17.7 | 468 | 9,570 |
| | 6 | Fe-9.6Si-5.4Al-1.0Ta | 20.6 | 487 | 8,560 |
| | 7 | Fe-9.6Si-5.4Al-0.2P | 19.8 | 479 | 8,640 |
| | 8 | Fe-9.6Si-5.4Al-1.0Nb-0.1Zr | 21.9 | 508 | 9,320 |
| | 9 | Fe-9.8Si-5.4Al | 17.3 | 459 | 7,080 |
| ALLOYS OF THIS INVENTION | Embodiment Example 1 | Fe-9.6Si-5.4Al-0.002B | 32.5 | 451 | 9,830 |
| | 2 | Fe-9.6Si-5.4Al-0.005B | 89 | 457 | 9,780 |
| | 3 | Fe-9.6Si-5.4Al-0.010B | 283 | 454 | 9,610 |
| | 4 | Fe-9.6Si-5.4Al-0.020B | 461 | 459 | 8,270 |
| | 5 | Fe-9.6Si-5.4Al-0.050B | 637 | 457 | 6,150 |
| | 6 | Fe-9.6Si-5.4Al-0.10B | 715 | 463 | 4,020 |
| | 7 | Fe-9.6Si-5.4Al-0.5B | 924 | 460 | 1,940 |
| | 8 | Fe-9.6Si-5.4Al-1.0B | 1,150 | 471 | 960 |
| | 9 | Fe-10.0Si-5.4Al-0.020B | 476 | 475 | 5,320 |
| | 10 | Fe-9.1Si-5.4Al-0.020B | 432 | 452 | 6,210 |
| | 11 | Fe-9.1Si-6.4Al-0.020B | 485 | 459 | 6,130 |
| | 12 | Fe-9.6Si-5.4Al-1.0Ti-0.020B | 976 | 485 | 7,850 |
| | 13 | Fe-9.6Si-5.4Al-2.5Ti-0.020B | 1,153 | 511 | 6,470 |
| | 14 | Fe-9.6Si-5.4Al-3.5Ti-0.020B | 1,211 | 533 | 5,020 |
| | 15 | Fe-9.6Si-5.4Al-0.2Zr-0.020B | 507 | 467 | 8,590 |
| | 16 | Fe-9.6Si-5.4Al- | | | |

TABLE 1-continued

| Examples | Example No. | Compositions | Time req'd for cutting (min.) | Micro-Vickers hardness | μe |
|---|---|---|---|---|---|
| | | 0.2Zr-0.020B | 522 | 476 | 8,470 |
| | 17 | Fe-9.6Si-5.4Al-1.0Ti-0.1Zr-0.010B | 741 | 482 | 9,200 |
| | 18 | Fe-9.6Si-5.4Al-1.0Ti-0.1Zr-0.020B | 1,024 | 480 | 8,060 |
| | 19 | Fe-9.6Si-5.4Al-1.0Ti-0.1Zr-0.050B | 1,404 | 488 | 6,320 |
| | 20 | Fe-9.6Si-5.4Al-1.0Ti-0.2Zr-0.020B | 960 | 486 | 7,950 |
| | 21 | Fe-9.6Si-5.4Al-2.0Ti-0.1Zr-0.020B | 1,108 | 502 | 6,530 |
| | 22 | Fe-9.6Si-6.2Al-2.0Ti-0.1Zr-0.020B | 1,116 | 509 | 6,760 |
| | 23 | Fe-9.6Si-5.4Al-2.0Ti-0.1Zr-0.5Mn-0.020B | 1,095 | 506 | 6,410 |
| | 24 | Fe-0.6Si-4.9Al-0.020B | 453 | 446 | 7,230 |
| | 25 | Fe-9.6Si-5.4Al-0.2Nb-0.020B | 531 | 464 | 7,980 |
| | 26 | Fe-9.6Si-5.4Al-1.0Ti-0.2Nb-0.020B | 1,039 | 490 | 7,390 |
| | 27 | Fe-9.6Si-6.4Al-1.0Ti-0.2Nb-0.020B | 1,092 | 495 | 7,250 |
| | 28 | Fe-9.6Si-5.4Al-0.05MM-0.020B | 470 | 461 | 8,370 |
| | 29 | Fe-9.6Si-5.4Al-0.10MM-0.020B | 494 | 465 | 8,430 |
| | 30 | Fe-9.6Si-5.4Al-0.2MM-0.020B | 508 | 470 | 8,560 |
| | 31 | Fe-9.6Si-5.4Al-0.4MM-0.020B | 525 | 474 | 8,490 |
| | 32 | Fe-9.6Si-5.4Al-0.8MM-0.020B | 547 | 483 | 8,350 |
| | 33 | Fe-9.6Si-6.2Al-0.2MM-0.020B | 513 | 475 | 3,000 |
| | 34 | Fe-9.6Si-5.4Al-0.5Ti-0.2MM-0.020B | 784 | 476 | 8,040 |
| | 35 | Fe-9.6Si-5.4Al-1.0Ti-0.2MM-0.020B | 956 | 480 | 7,970 |
| | 36 | Fe-9.6Si-5.4Al-2.0Ti-0.2MM-0.020B | 1,098 | 490 | 6,650 |
| | 37 | Fe-9.6Si-6.4Al-3.0Ti-0.2MM-0.020B | 1,203 | 518 | 6,360 |
| | 38 | Fe-9.6Si-5.4Al-2.0Ti-0.2MM-0.002B | 52 | 501 | 9,020 |
| | 39 | Fe-9.6Si-5.4Al-2.0Ti-0.20MM-0.005B | 125 | 507 | 8,870 |
| | 40 | Fe-9.6Si-5.4Al-2.0Ti-0.20MM-0.010B | 860 | 503 | 7,530 |
| | 41 | Fe-9.6Si-5.4Al-2.0Ti-0.20MM-0.50B | 1,281 | 517 | 4,890 |
| | 42 | Fe-9.6Si-5.4Al-2.0Ti-0.20MM-0.16B | 1,399 | 525 | 2,790 |
| | 43 | Fe-9.6Si-6.2Al-2.0Ti-0.20MM-0.020B | 1,102 | 500 | 6,790 |
| | 44 | Fe-9.6Si-5.4Al-1.0Ta-0.020B | 575 | 490 | 6,790 |
| | 45 | Fe-9.6Si-5.4Al-0.2p-0.020B | 557 | 477 | 6,840 |
| | 46 | Fe-9.6Si-5.4Al-1.0Nb-0.020B | 583 | 508 | 7,610 |
| | 47 | Fe-9.6Si-5.4Al-1.0Nb-0.1Zr-0.020B | 601 | 514 | 7,630 |
| | 48 | Fe-9.8Si-5.4Al-1.0Ti-0.1Zr-0.020B | 1,164 | 480 | 5,050 |
| | 49 | Fe-9.6Si-6.4Al-1.0Ti-0.1Zr-0.020B | 1,148 | 501 | 4,970 |
| | 50 | Fe-10.0Si-5.4Al-0.1Zr-0.020B | 479 | 476 | 5,120 |
| | 51 | Fe-9.6Si-4.4Al-0.1Zr-0.020B | 450 | 450 | 7,150 |
| | 52 | Fe-9.6Si-5.4Al-1.0W-0.020B | 597 | 511 | 7,030 |
| | 53 | Fe-9.6Si-5.4Al-1.0W-0.1Zr-0.020B | 625 | 513 | 6,980 |
| | 54 | Fe-9.6Si-5.4Al-0.5Ti-0.1Zr-0.020B | 803 | 475 | 8,210 |
| | 55 | Fe-9.6Si-5.4Al-1.0Ti-0.05Zr-0.020B | 1,002 | 483 | 7,990 |
| | 56 | Fe-9.6Si-5.4Al-0.2MM- | | | |

TABLE 1-continued

| Examples | Example No. | Compositions | Time req'd for cutting (min.) | Micro-Vickers hardness | μe |
|---|---|---|---|---|---|
| | | 0.002B | 46 | 461 | 9,930 |
| | 57 | Fe-9.6Si-5.4Al-0.2MM-0.025B | 97 | 457 | 9,870 |
| | 58 | Fe-9.6Si-5.4Al-0.2MM-0.010B | 304 | 465 | 9,710 |
| | 59 | Fe-9.6Si-5.4Al-0.2MM-0.050B | 683 | 468 | 6,350 |
| | 60 | Fe-9.6Si-5.4Al-0.2MM-0.16B | 792 | 471 | 4,060 |
| | 61 | Fe-9.6Si-5.4Al-0.2La-0.020B | 819 | 469 | 8,640 |
| | 62 | Fe-9.6Si-6.2Al-0.2Ce-0.020B | 785 | 470 | 8,920 |
| | 63 | Fe-9.6Si-6.2Al-0.25M-0.020B | 769 | 466 | 8,690 |
| | 64 | Fe-9.6Si-0.2Al-0.2Y-0.020B | 801 | 475 | 8,530 |
| | 65 | Fe-9.6Si-6.2Al-0.2La-0.020B | 795 | 469 | 8,850 |

What is claimed is:

1. A wear-resistant alloy suitable for use as a core for magnetic recording heads consisting essentially of a heat treated, boron-modified alloy of the groups (1) alloys consisting essentially of 4–8 wt.% aluminum, 8–11 wt.% silicon and the balance Fe; (2) alloys consisting of a member of (1) above containing 0.01–3.5 wt.% of a member of the group consisting of Ti, Zr, Mn, Ge, Mo, Nb, Cu, Be, W, Ta, Hf, Pt, Cr, V, Sb and mixtures thereof; and (3) alloys consisting of a member of (1) and (2) above containing 0.01–1.0 wt.% of a member of the group consisting of rare earth metals and phosphorus; said wear-resistant alloy containing said boron modifier at a concentration of 0.01 to 1.0 wt.% and having a wear resistance above 32.5 minutes in the case of cutting under the conditions described in the examples.

2. The wear-resistant alloy of claim 1 having an effective permeability of 960–9930 and a microvickers hardness greater than 446.

3. The wear-resistant alloy of claim 2 containing 0.3–2.5 wt.% Ti and 0.05–0.3 wt.% Zr.

4. The wear-resistant alloy of claim 2 containing a rare earth metal at a concentration of 0.01–1.0 wt.%.

5. The wear-resistant alloy of claim 1 which has been heat treated after shaping to core ingot piece at a temperature of 700–1000° C.

6. A wear-resistant alloy of claim 1 consisting essentially of 4–8 wt.% aluminum, 8–11 wt.% silicon, 0.01–1.0 wt.% boron and the balance Fe, having been subjected after casting into ingot to an annealing temperature in the range of 700–1000° C.

* * * * *